(12) United States Patent
Smith (10) Patent No.: US 11,927,536 B2
(45) Date of Patent: Mar. 12, 2024

(54) SPECTROSCOPIC APPARATUS AND METHODS

(71) Applicant: RENISHAW PLC, Wotton-under-Edge (GB)

(72) Inventor: Brian John Edward Smith, Dursley (GB)

(73) Assignee: RENISHAW PLC, Wotton-under-Edge (GB)

( * ) Notice: Subject to any disclaimer, the term of this patent is extended or adjusted under 35 U.S.C. 154(b) by 438 days.

(21) Appl. No.: 17/277,895

(22) PCT Filed: Oct. 17, 2019

(86) PCT No.: PCT/GB2019/052966
§ 371 (c)(1),
(2) Date: Mar. 19, 2021

(87) PCT Pub. No.: WO2020/079439
PCT Pub. Date: Apr. 23, 2020

(65) Prior Publication Data
US 2021/0349030 A1      Nov. 11, 2021

(30) Foreign Application Priority Data
Oct. 19, 2018   (GB) .................................... 1817028

(51) Int. Cl.
*G01N 21/65* (2006.01)
(52) U.S. Cl.
CPC ......... *G01N 21/65* (2013.01); *G01N 2201/12* (2013.01)
(58) Field of Classification Search
CPC .................................................... G01N 21/65
USPC .......................................................... 702/189
See application file for complete search history.

(56) References Cited

U.S. PATENT DOCUMENTS

| | | | |
|---|---|---|---|
| 5,442,438 A | 8/1995 | Batchelder et al. | |
| 5,510,894 A | 4/1996 | Batchelder et al. | |
| 5,689,333 A | 11/1997 | Batchelder et al. | |
| 6,137,104 A | 10/2000 | Webb et al. | |

(Continued)

FOREIGN PATENT DOCUMENTS

| | | |
|---|---|---|
| JP | 2001-59772 A | 3/2001 |
| JP | 2005-43271 A | 2/2005 |

(Continued)

OTHER PUBLICATIONS

Wang et al; "A baseline correction algorithm for Raman spectroscopy by adaptive knots B-spline;" Measurement, Science & Technology; 2015; pp. 1-7; vol. 26.

(Continued)

*Primary Examiner* — Ricky Go
(74) *Attorney, Agent, or Firm* — Oliff PLC (57) ABSTRACT

A method of smoothing spectral data recorded by a spectrometer including successively fitting a plurality of spline curves to the spectral data, each spline curve having a different number of knots. A knot position of each knot, other than end point knots, in each spline curve is determined based upon a measure of fit of points of a previously fitted one of the spline curves having fewer knots to the spectral data. The method further includes selecting one of the spline curves as a smoothed data curve of the spectral data based upon a model selection criterion.

13 Claims, 5 Drawing Sheets

(56) References Cited

U.S. PATENT DOCUMENTS

| | | | |
|---|---|---|---|
| 6,253,164 B1* | 6/2001 | Rohm | G06T 17/20 |
| | | | 703/2 |
| 8,145,488 B2 | 3/2012 | Yu et al. | |
| 9,784,621 B2 | 10/2017 | Smith | |
| 9,996,952 B1* | 6/2018 | Parker | G06T 11/203 |
| 10,062,190 B1* | 8/2018 | Parker | G06T 11/206 |
| 2006/0017720 A1* | 1/2006 | Li | G01B 11/2504 |
| | | | 345/419 |
| 2010/0070280 A1 | 3/2010 | Yu et al. | |
| 2010/0292957 A1* | 11/2010 | Satulovsky | G06F 17/18 |
| | | | 702/179 |
| 2014/0046630 A1 | 2/2014 | Smith | |
| 2014/0085630 A1 | 3/2014 | Bell et al. | |

FOREIGN PATENT DOCUMENTS

| | | |
|---|---|---|
| JP | 2014-514581 A | 6/2014 |
| JP | 2015-532977 A | 11/2015 |
| WO | 2012/156667 A1 | 11/2012 |
| WO | 2014/064447 A1 | 5/2014 |
| WO | 2018/065756 A1 | 4/2018 |

OTHER PUBLICATIONS

Zheng et al; "Fast B-spline curve fitting by L-BFGS;" Computer Aided Geormetric Design; 2012; pp. 448-462; vol. 29, No. 7.

Mar. 28, 2019 Search Report issued in British Patent Application No. GB I 817028.2.

Feb. 5, 2020 Search Report issued in International Patent Application No. PCT/GB2019/052966.

Feb. 5, 2020 Writen Opinion of the International Searching Authority issued in International Patent Application No. PCT/GB2019/052966.

* cited by examiner

SPECTROSCOPIC APPARATUS AND METHODS

FIELD OF THE INVENTION

This invention relates to spectroscopic apparatus and methods. It is particularly useful in Raman spectroscopy, though it can also be used in other forms of spectroscopy, e.g. narrow-line photoluminescence, fluorescence, cathodoluminescence, UV visible (UV Vis), nuclear magnetic resonance (NMR), mid infra-red (mid-IR) or near infra-red (NIR).

BACKGROUND

The Raman Effect is the inelastic scattering of light by a sample. In Raman Spectroscopy, a sample is irradiated by monochromatic laser light and the scattered light is then dispersed by a dispersive device, such as a diffraction grating, e.g. in a monochromator, to generate a spectrum called a Raman spectrum. The Raman spectrum is detected by a detector such as a charge-coupled device (CCD) to generate spectral data. Examples of Raman spectroscopy apparatus are known from U.S. Pat. Nos. 5,442,438 and 5,510,894, which are incorporated herein by reference.

Different chemical compounds have different characteristic Raman spectra. Accordingly, the Raman effect can be used to analyse chemical compounds present in a sample.

Figure 1:
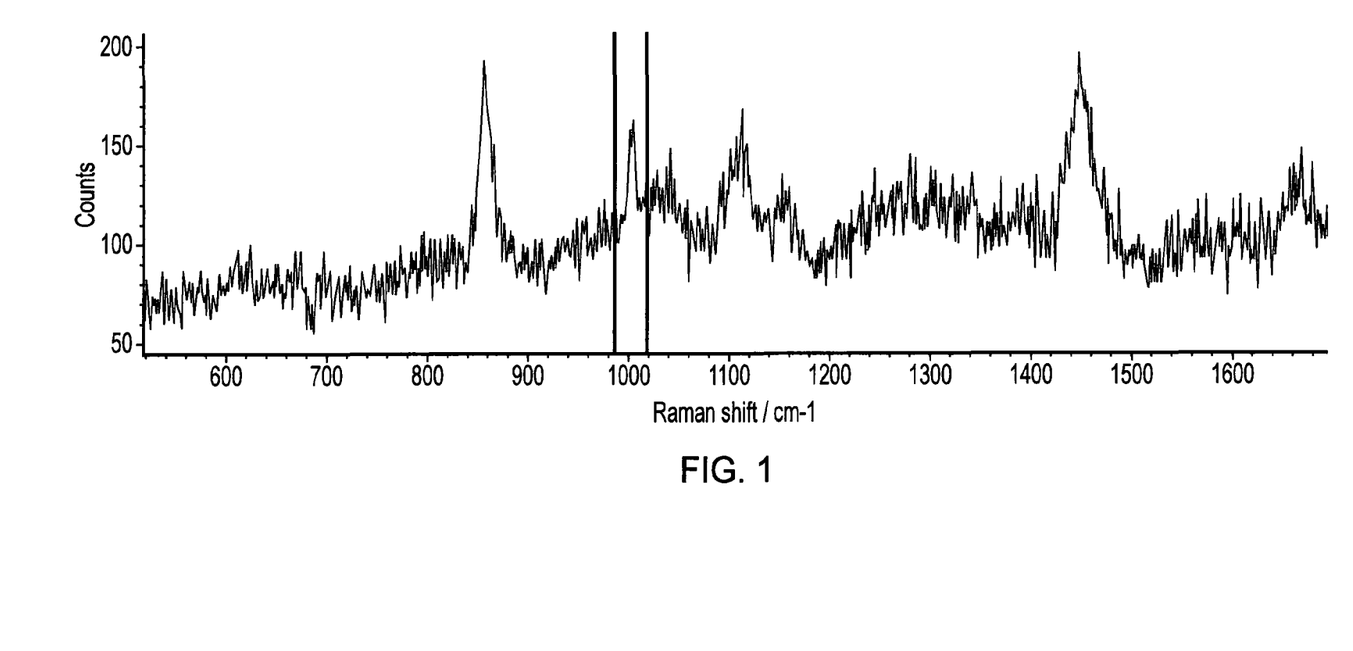
FIG. 1 shows spectral data recorded by a Raman spectrometer including both the Raman spectrum and noise.

The spectral data comprises the Raman spectrum together with noise. The presence of noise can affect an analysis of the Raman signal. For example, if the analysis comprises determining an area under a peak within the signal, the presence of noise can make it difficult to identify a suitable base line from which to determine the area. FIG. 1 is an example of spectral data containing Raman spectral peaks and noise. As can be seen, the presence of noise obscures the spectral peaks.

A Savitzky-Golay filter is a digital filter that can be applied to a set of digital data points for the purpose of smoothing the data, that is to increase the signal-to-noise ratio without greatly distorting the signal. However, such smoothing techniques are inappropriate for spectral signals with sharp peaks as Savitzky-Golay smoothing tends to remove the sharp spectral peaks as well as the unwanted noise.

SUMMARY OF INVENTION

According to a first aspect of the invention there is provided a method of smoothing spectral data recorded by a spectrometer comprising successively fitting a plurality of spline curves to the spectral data, each spline curve having a different number of knots, wherein a knot position of each knot, other than end point knots, in each spline curve is determined based upon a measure of fit of points of a previously fitted one of the spline curves having fewer knots to the spectral data; and selecting one of the spline curves as a smoothed data curve of the spectral data based upon a model selection criterion.

In this way, a spacing between the knots is adjusted based upon local information content of the spectral data, retaining sharp spectral peaks in the smoothed data curve whilst equally sharp noise is removed.

The term "spline curve" as used herein means a function defined piecewise by one or more polynomials. Each polynomial extends between two points called knots. A total number of knots in each spline curve of the plurality of spline curves may be between 2 (i.e. only two end point knots) and N/K, wherein N is the total number of data points in the spectral data and K a minimum allowed knot separation, in points. K is typically greater than 1 and preferably between 2 and 10. The end point knots are knots located at either end of the spline curve between which all the polynomials are fitted.

The knot position may correspond to a position of a poorly fitted point of the previously fitted one of the spline curves as determined using the measure of fit. The poorly fitted point may be a point having a fit that is not the best fit of all the points, a point that is one of the 50%, and preferably one of the 10%, worst fitting points, and preferably is the worst fitted point, as determined by the measure of fit for allowed positions for the knot. One or more limitations may be prescribed for the position of the knot. For example, the allowed positions for the knot position may be positions that are more than a predetermined number of data points, such as 1, 2, 3 or more, away from knots of the previously fitted spline curve. This ensures there is a minimum knot separation distance.

The model selection criterion may be a measure that increases with likelihood of fit of the spline curve to the spectral data but balanced against a penalty for adding parameters in the form of the knots, such as the Bayesian information criterion or the Akaike information criterion. In this way, overfitting is mitigated.

The spline curves of the plurality of spline curves may have between 2 and N/K knots, and the method comprises determining which one of the plurality of spline curves results in an extremum (for BIC and AIC, a minimum) for the model selection criterion.

The method may comprise successively fitting each of the plurality of spline curves to the spectral data, starting with the spline curve with the least number of knots and ending with the spline curve with the most number of knots. Each successively fitted spline curve may have (only) one more knot from an immediately preceding spline curve fitted to the spectral data. The position of a knot added for each successively fitted spline curve may correspond to the position of the poorly fitted point of the immediately preceding spline curve Alternatively, each successively fitted curve may have a random number of knots added or subtracted relative to the knots used for the immediately preceding fitted spline curve (although the requirement that the total number of knots must be between 2 and N/K may remain).

The measure of fit for each point of a fitted spline curve may be based upon a discrepancy (e.g. a residual) between the point and a corresponding point in the spectral data. However, it will be understood that the measure of fit for each point may not be based upon that point in isolation but may be based upon the residuals between other points, such as neighbouring (e.g. directly neighbouring) points or all preceding points, of the fitted spline curve and the corresponding points in the spectral data. For example, a knot position may be determined by generating a residual smoothed curve by applying a smoothing algorithm, such as a Savitzky-Golay filter, to the residuals for all of the points of the previously fitted spline curve, wherein the knot position corresponds to a point of a maxima on the residual smoothed curve. In an alternative embodiment, the measure of fit for each point may be determined from a cumulative sum of the residuals to that point as one progresses successively along the points. The knot position corresponds to a point of a maxima on a curve of the cumulative sum of the residuals. Taking into account the residuals of other points may be used to reduce the likelihood that a knot is located at a top of a peak. Locating knots at or near the top of a peak can result in a lack of smoothness in this region. Using such measures of fit, the "worst" fitting point may not be the point that results in the largest residual from the spectral data and thus may not be a point at the top of a peak.

The method may comprise identifying a property of a sample that generated the spectral data from analysis of the smoothed data curve. The method may comprise identifying one or more components present in the sample. The method may comprise determining an area under a curve of the smoothed data curve to identify a property, such as concentration, of a component in the sample. The method may comprise generating a map of the sample based upon a property of the sample identified from the smoothed data curve.

The method may comprise outputting the smoothed data curve, for example on a display, as a spectrum representative of the sample. For example, the user may be able to more easily visually identify one or more components present in the sample from the smoothed data curve.

The method may comprise searching a library of component spectra based upon the smoothed data curve.

The method may comprise analysing the smoothed data curve to identify a property of the sample and controlling a process and/or carrying out further processing on the sample based upon the identified property. For example, the process may be a manufacturing process. The sample may be a sample of one or more manufactured products and the identified property may be used to determine if the manufactured products meet a required specification. Failure to meet the required specification may require an adjustment of the process such that products are manufactured to the required specification. The sample may be a tissue sample and the process may be treatment of a patient providing the tissue sample. The method may be used as part of a checking procedure, for example a security procedure or a quality control procedure), comprising generating an alarm based upon the analysis of the smoothed data curve.

According to a second aspect of the invention there is provided a processor arranged to carry out the method of the first aspect of the invention.

According to a third aspect of the invention there is provided a spectrometer system comprising a spectrometer for obtaining spectral data from a sample and a processor according to the second aspect of the invention.

According to a fourth aspect of the invention there is provided a data carrier having instructions stored thereon, which instructions, when executed by a process cause the process or to carry out the method of the first aspect of the invention.

The data carrier may be a non-transient data carrier, such as volatile memory, eg RAM, non-volatile memory, eg ROM, flash memory and data storage devices, such as hard discs, optical discs, or a transient data carrier, such as an electronic or optical signal.

DESCRIPTION OF EMBODIMENTS

Figure 2:
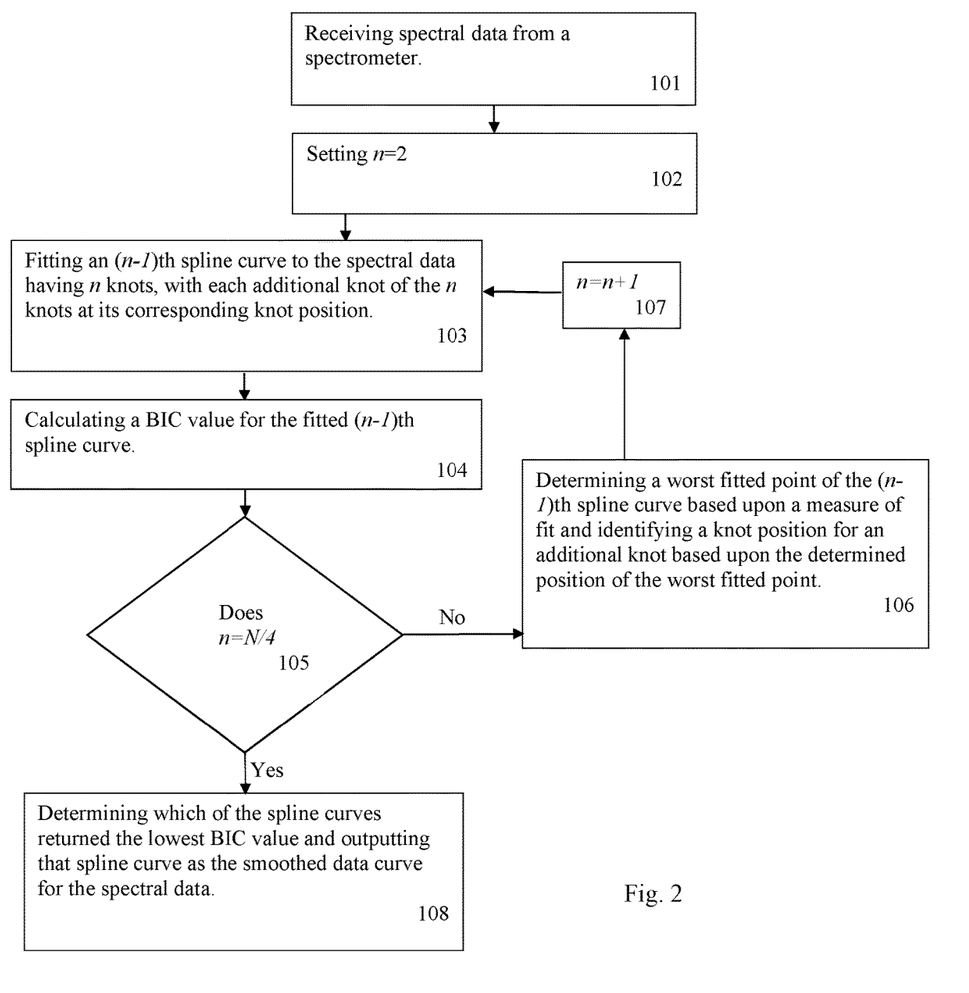
FIG. 2 is a flowchart showing an embodiment of the invention.

Referring to FIG. 2, an embodiment of the invention comprises receiving 101, for example by a computer, spectral data recorded by a spectrometer. The spectral data may be data generated by a Raman spectrometer. FIG. 1 illustrates the type of spectral data that may be received comprising a number of counts for each wavenumber (Raman shift), the counts being a measurement of an intensity of collected light at that wavenumber. The spectral data comprises spectral information and noise. The Raman spectrometer may be in accordance with that described in WO 2012/156667, which is incorporated herein by reference.

The computer processes the spectral data to generate a smoothed data curve representative of the spectral data without the noise. The method of generating smoothed data comprises successively fitting 103 a plurality of spline curves having a different number of knots to the spectral data. Each spline curve of the plurality of spline curves has a number of knots, n, varying from 2 to N/K, wherein N is a total number of data points in the spectral data and K is the minimum separation distance between the knots in points. A model selection value is calculated 104 for each spline curve in accordance with a model selection criterion. In this embodiment, the model selection value is a BIC value calculated using a Bayesian Information Criterion (BIC) given by:—

$$\text{BIC} = \ln(N)k - A\ln(\hat{L}), \quad (1)$$

where $\hat{L}$ is the maximised value of the likelihood function of the fitted spline curve, N the number of data points in the spectral data, k the number of parameters estimated by the spline curve and A the relative weighting between the two terms of the BIC. For a spline comprising the fitting of cubic polynomials per spline interval, k is taken to be 4n as the number of variables returned per spline interval is 4. For a classical BIC, A would have a value of 2. However, the invention includes embodiments, wherein A has a value between 0.5 and 10. Values other than 2 may be justified as the BIC derivation assumes uniform noise, whereas the spectral data may not comprise uniform noise, and/or the number of variables added by each knot may be different from 4.

The spline curve having the lowest BIC value is then returned 108 as the smoothed data curve for the spectral data.

In this embodiment, the algorithm starts by fitting 103 a first spline curve having two knots positioned at the end points of the spectral data. A BIC value is calculated 104 for the fitted first spline curve. If the number of knots is determined 105 to be less than N/K then the worst fitted point of the first spline curve is determined 106 in accordance with a measure of fit.

In a first embodiment, the measure of fit for each point is the residual between that point on the spline curve and corresponding point in the spectral data. The point with the largest residual for points deemed as candidate locations for the additional knot is deemed to be the worst fitted point. A knot position for the additional knot for the next spline curve is then specified as the wavenumber position for the worst fitted point. A minimum separation distance may be set for the knots. Accordingly, only points outside of the minimum threshold distance (number of data points) from existing knots may be considered as candidate locations for the additional knot. The minimum separation distance may be selectable by a user, but typically, it would be greater than 0 (such that two knots cannot be located in the same position). A minimum separation distance of 3 has been found to be effective, i.e. K=3.

Like the first spline curve, the next spline curve with the additional knot is fitted 103 to the spectral data and the BIC is calculated 104 for the fitted spline curve.

This loop 103 to 107 is then repeated such that further spline curves with different numbers of knots are fitted to the spectral data and the BIC values calculated until a spline curve having N/K knots has been fitted to the spectral data.

In step 108, the spline curve of the plurality of spline curves having the lowest BIC value is output as a smoothed data curve for the spectral data.

The smoothed data curve may be displayed to a user and/or used for analysis of the sample that generated the spectral data. Using the smoothed data curve for analysis and generating representations of the sample may result in a clearer and/or more accurate representation of the information of interest.

Figure 3:
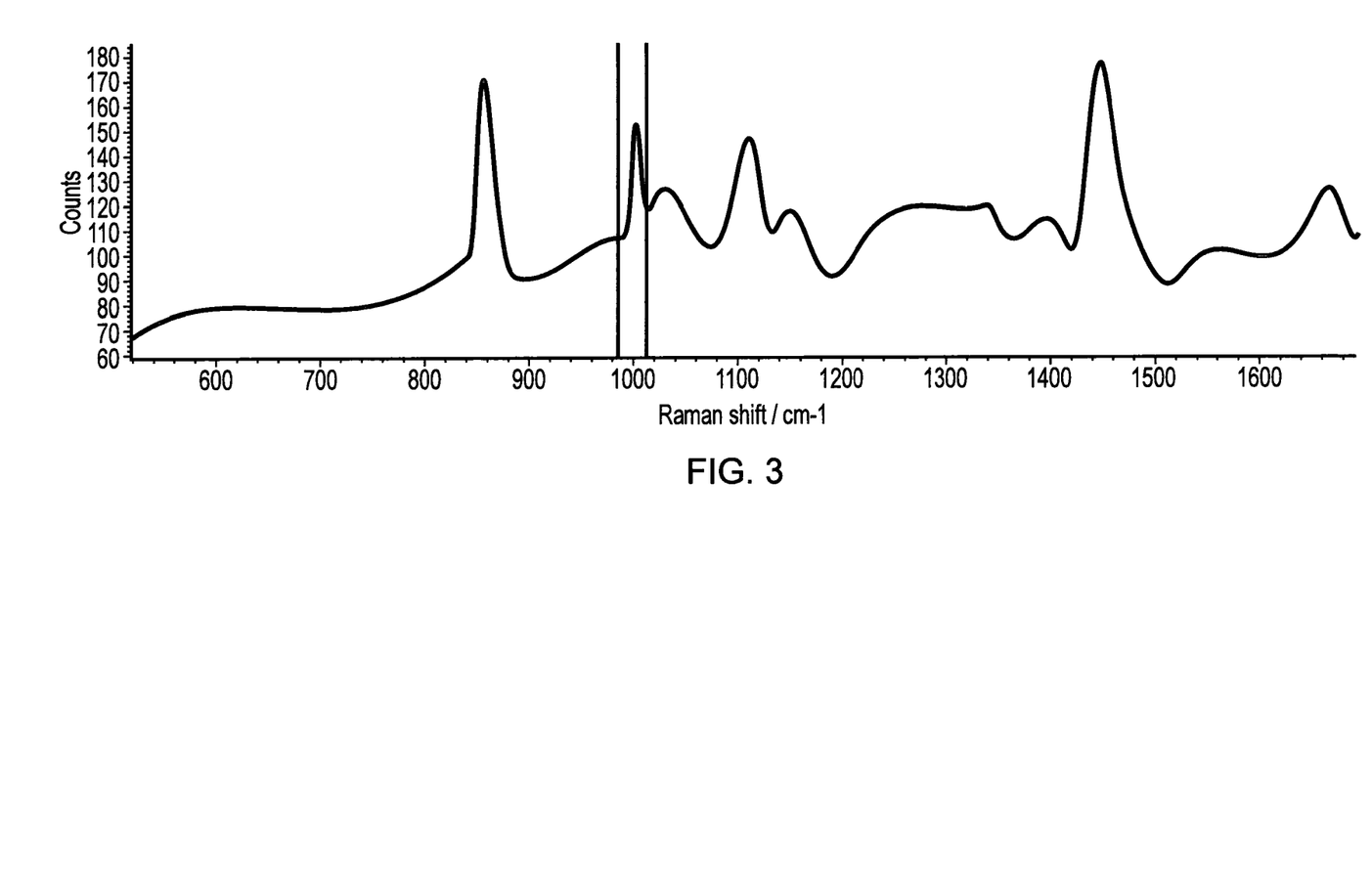
FIG. 3 shows a smoothed data curve generated from the spectral data shown in FIG. 1.
Figure 4A:
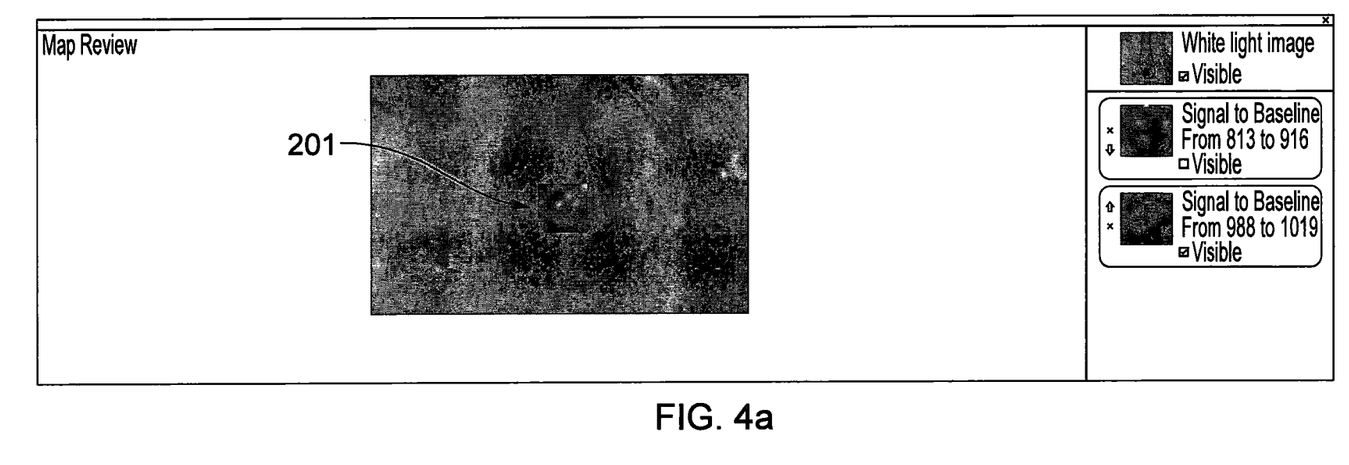
FIG. 4*a* shows a map of a sample based upon an analysis of unsmoothed spectral data generated by different points on the sample.
Figure 4B:
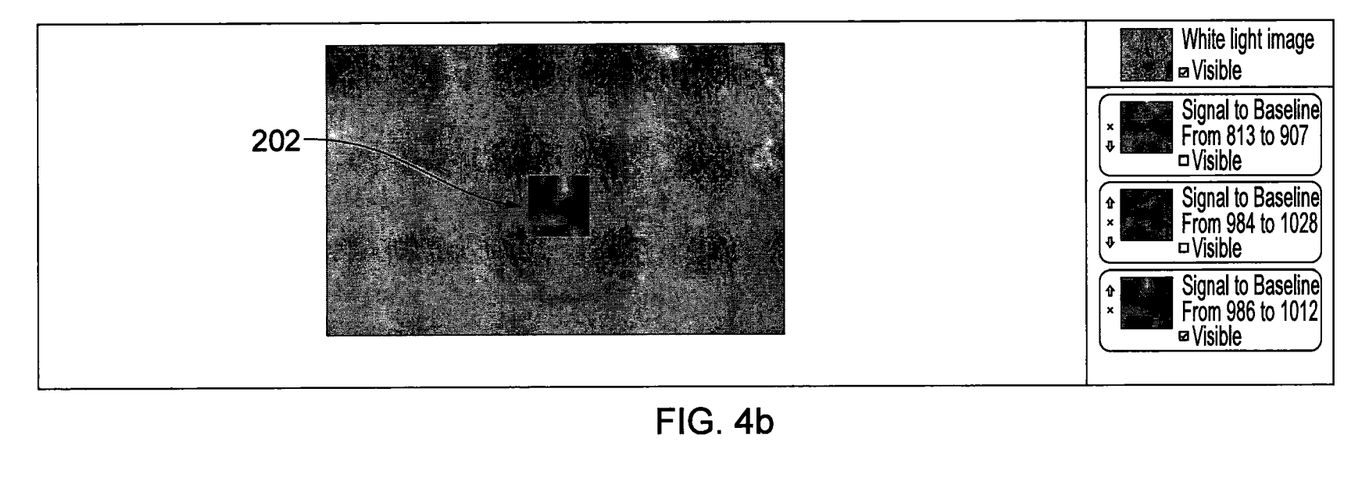
FIG. 4*b* shows a corresponding map, wherein the analysis is carried out on a smoothed data curve for the spectral data.

FIGS. 4a and 4b illustrate maps 201, 202 generated from the same Raman spectral data generated by a sample. The map 201, 202 of the spectral data is overlaid over a larger white light image of the sample. The maps represent an area under the Raman peak between 989 nm and 1019 nm for different points on the sample. FIGS. 1 and 3 illustrate the peak of interest. FIG. 4a is a map generated from the raw spectral data, whereas FIG. 4b is a map generated from the smoothed data curve generated from the spectral data. As can be seen, the two maps are substantially different. To determine the Raman peak, a baseline is set corresponding to background sources of radiation. However, the noise in the signal can create uncertainty in a location of this baseline. Inconsistencies in the locating of the baseline can result in variations in the calculated area under the peak and therefore, non-representative mappings of the sample. Removing the noise through curve smoothing mitigates this problem and may result in a mapping that is more representative of the sample composition.

Figure 5:
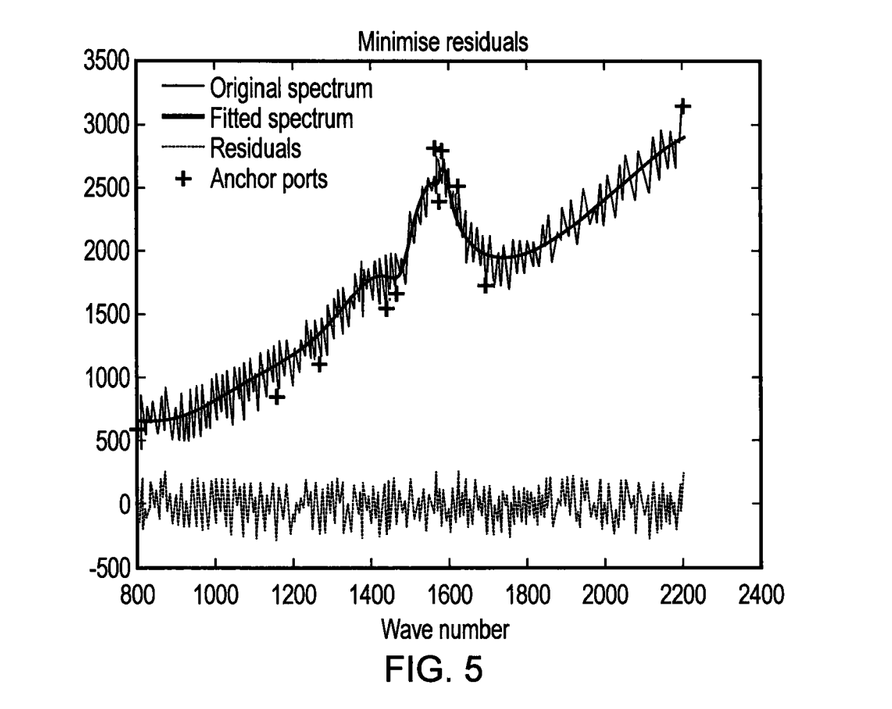
FIG. 5 shows spectral data overlaid with the smoothed data curve determined using a first measure of fit, wherein the knot positions are shown.

FIG. 5 shows spectral data, a smoothed data curve generated in accordance with the above described embodiment, the residuals between the smoothed data curve and the spectral data and the knot positions (referred to as anchor points). As can be seen, for this example, a number of the knots are located at a position coinciding with a spectral peak. This can result in unnatural shapes, such as the kink shown in FIG. 5. To mitigate this problem, a different measure of fit can be used to reduce the likelihood that a top of a spectral peak is identified as a knot position. For example, the measure of fit for each point may be determined from a smoothed curve of the residuals (referred to herein as the "residual smoothed curve"). Such a residual smoothed curve may by generated by applying a smoothing algorithm, such as a Savitzky-Golay filter, to the residuals for all of the points of the previously fitted spline curve. The knot position for the additional knot may correspond to a point of a maxima on the residual smoothed curve.

Figure 6:
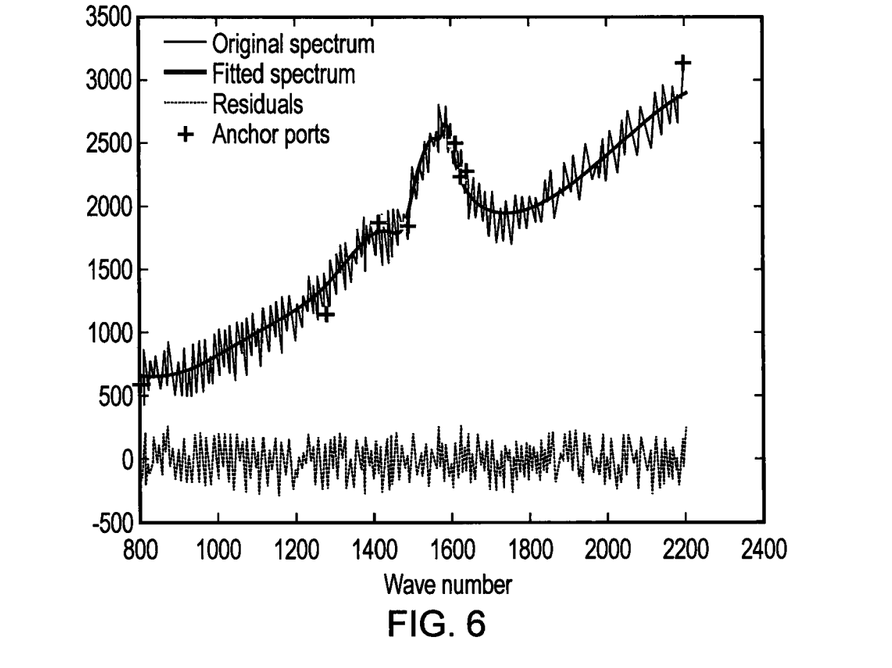
FIG. 6 shows spectral data overlaid with the smoothed data curve determined using a second measure of fit, wherein the knot positions are shown.

FIG. 6 shows spectral data and a smoothed data curve generated in accordance with a measure, wherein a measure of fit for each point is dependent on residuals for other points as well as the point of interest. FIG. 6 also shows the residuals between the smoothed data curve and the spectral data and the knot positions (referred to as anchor points). As can be seen, using this alternative measure of fit may result in the knots being positioned away from a top of the spectral peak and therefore, a smoother peak shape in the smoothed data curve.

It will be understood that modification and alterations may be made to the above described embodiments without departing from the invention as defined herein.

The invention claimed is:

1. A method of smoothing spectral data recorded by a spectrometer, the method comprising:
   successively fitting a plurality of spline curves to the spectral data,
      each spline curve having a different number of knots, and
      a knot position of each knot, other than end point knots, in each spline curve being determined based upon a measure of fit to the spectral data of points of a previously fitted one of the plurality of spline curves having fewer knots;
   selecting one of the spline curves as a smoothed data curve of the spectral data based upon a model selection criterion;
   analyzing the smoothed data curve to identify a property of a sample that generated the spectral data; and
   controlling a process and/or carrying out further processing on the sample based upon the identified property.

2. The method according to claim 1, wherein the determined knot position corresponds to a position of a point of the previously fitted one of the plurality of spline curves that, as determined using the measure of fit, has a fit that is not the best fit of all of the points of the previously fitted spline curve.

3. The method according to claim 2, wherein the not best fit of the point of the previously fitted spline curve is the worst for all points that are allowed positions for the knot.

4. The method according to claim 1, wherein the measure of fit for each point of the previously fitted spline curve is based upon a residual between the point and a corresponding point in the spectral data.

5. The method according to claim 4, wherein the measure of fit for each point is based upon the residuals between other points of the previously fitted spline curve and corresponding points in the spectral data.

6. The method according to claim 1, wherein the model selection criterion is a measure that increases with likelihood of fit of a said spline curve to the spectral data but is balanced against a penalty for adding parameters in the form of the knots.

7. The method according to claim 1, wherein
   the spline curves of the plurality of spline curves have between 2 and N/K knots, and
   the method comprises determining which one of the plurality of spline curves results in an extremum for the model selection criterion, N being the number of data points in the spectral data and K being a minimum separation distance, in points, between the knots.

8. The method according to claim 1, wherein successively fitting each of the plurality of spline curves to the spectral data comprises starting with the spline curve with the least number of knots and ending with the spline curve with the most number of knots.

9. The method according to claim 8, wherein each successively fitted spline curve of the plurality of spline curves has one more knot from an immediately preceding spline curve fitted to the spectral data.

10. The method according to claim 8, wherein the position of a knot added for each successively fitted spline curve of the plurality of spline curves corresponds to a position of a point of the immediately preceding spline curve that has a fit that is not the best fit of all of the points of the immediately preceding spline curve.

11. A processor configured to carry out the method of claim 1.

12. A spectrometer system comprising a spectrometer for obtaining spectral data from a sample and the processor according to claim 11.

13. A non-transitory computer-readable medium having instructions stored thereon that, when executed by a processor, cause the processor to carry out the method of claim 1.

\* \* \* \* \*